June 24, 1930.  L. A. GALE  1,767,207
CARD THROWING MACHINE
Filed Jan. 24, 1927    7 Sheets-Sheet 1
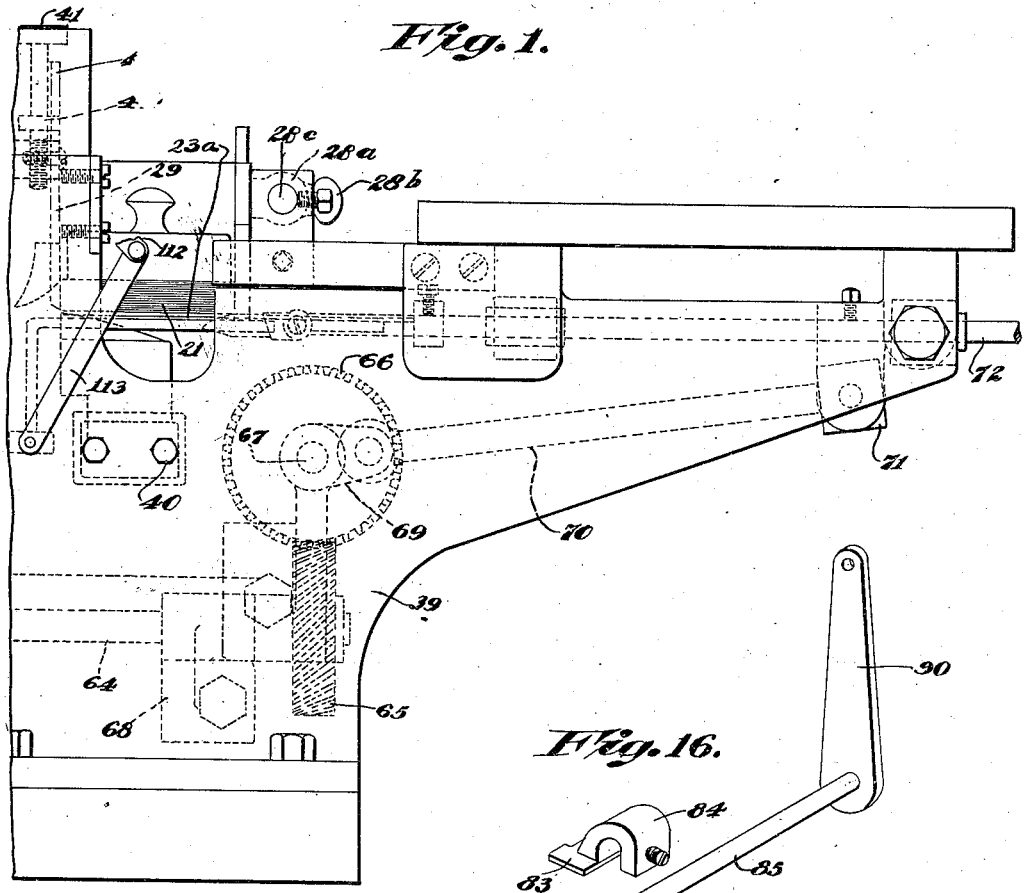
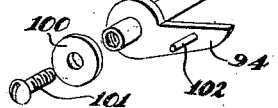
Inventor
Laburton A. Gale
by Barton A. Bean Jr.
Atty June 24, 1930.    L. A. GALE    1,767,207
CARD THROWING MACHINE
Filed Jan. 24, 1927    7 Sheets-Sheet 2

Inventor
Laburton A. Gale
Barton A. Beau
Atty

June 24, 1930.　　　L. A. GALE　　　1,767,207
CARD THROWING MACHINE
Filed Jan. 24, 1927　　7 Sheets-Sheet 3

Inventor
Laburton A. Gale
by Barton A. Bean Jr.
Atty

June 24, 1930.   L. A. GALE   1,767,207
CARD THROWING MACHINE
Filed Jan. 24, 1927   7 Sheets-Sheet 4

Inventor
Laburton A. Gale
by Barton A. Bean Jr.
Atty

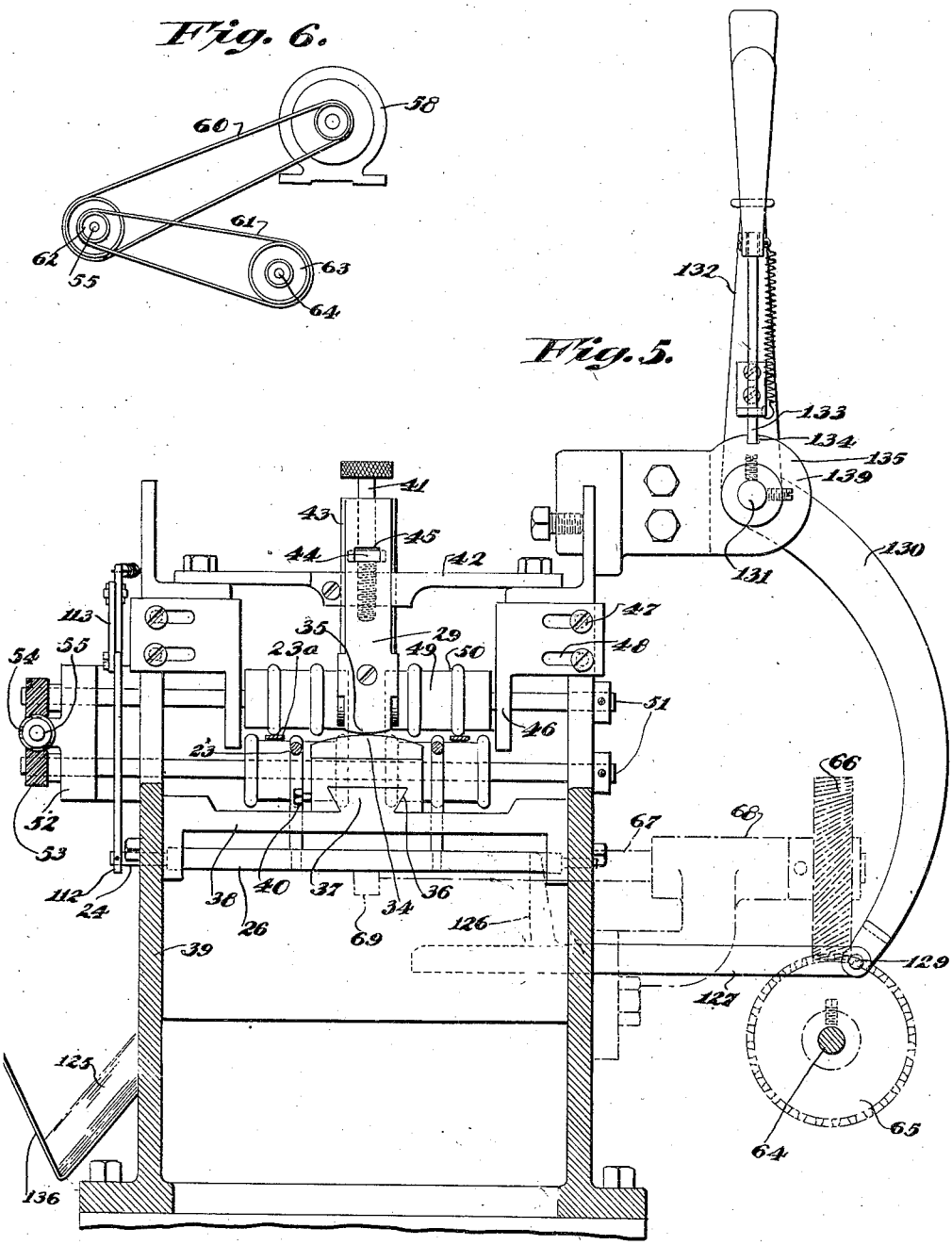
June 24, 1930.  L. A. GALE  1,767,207
CARD THROWING MACHINE
Filed Jan. 24, 1927  7 Sheets-Sheet 5
Inventor
Laburton A. Gale
by Barton A. Bean
Atty June 24, 1930.   L. A. GALE   1,767,207
CARD THROWING MACHINE
Filed Jan. 24, 1927   7 Sheets-Sheet 6
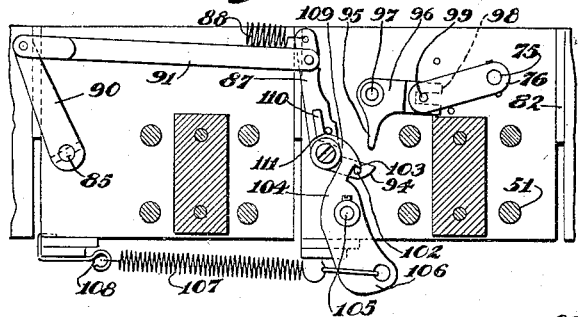
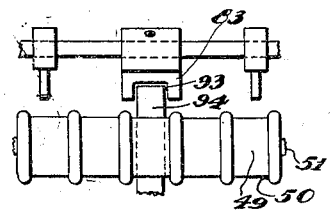
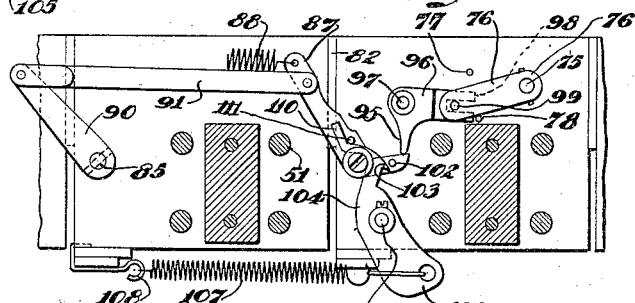
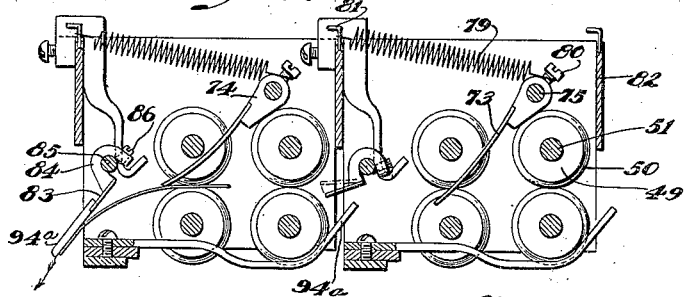
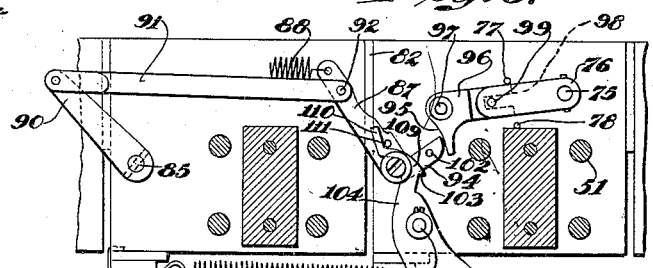
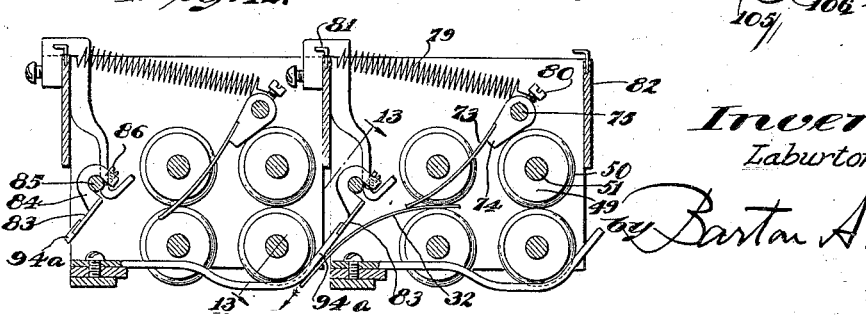
Inventor
Laburton A. Gale
by Barton A. Beau
Atty

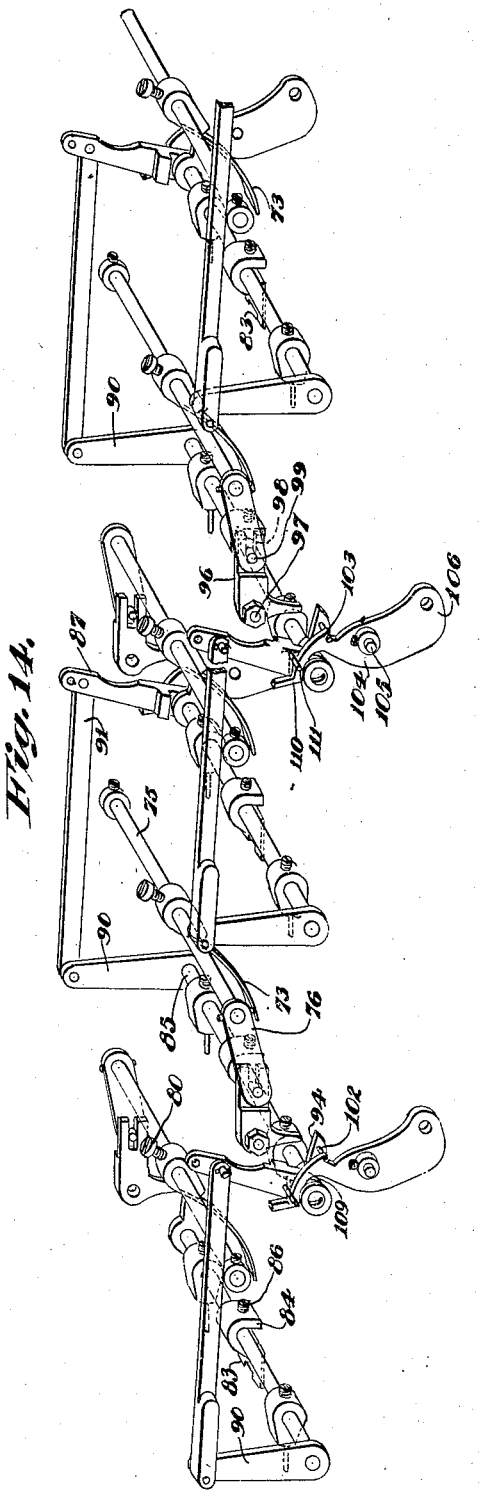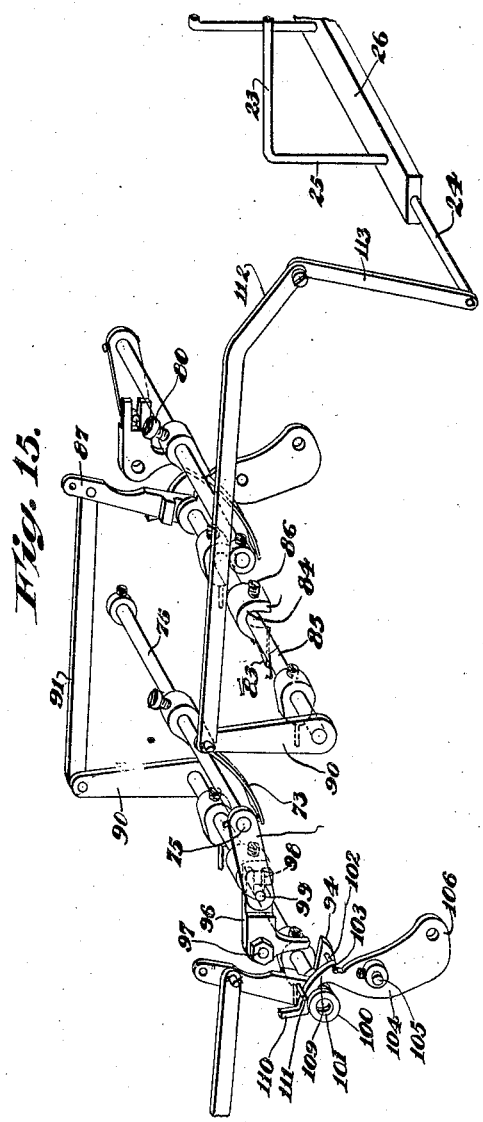

Patented June 24, 1930

1,767,207

UNITED STATES PATENT OFFICE

LABURTON A. GALE, OF BELMONT, MASSACHUSETTS, ASSIGNOR, BY MESNE ASSIGNMENTS, TO REMINGTON RAND INC., OF NEW YORK, N. Y., A CORPORATION OF DELAWARE

CARD-THROWING MACHINE

Application filed January 24, 1927. Serial No. 162,993.

This invention relates to mechanism for sorting or throwing cards or other documents and relates more particularly to a machine of the class described in which a series of receiving boxes is provided to successively receive cards to be sorted.

It frequently happens in the printing industry that it is desired to re-arrange a number of groups of duplicate cards, each group representing a different style or variety of cards so that a number of new groups are formed, each group containing one card of each style or variety. This work has heretofore been done by hand, with the result that a large amount of labor and time is necessary in order to re-arrange the cards or documents.

An object of this invention, therefore, is to provide a machine in which groups of duplicate cards are quickly and mechanically arranged in groups of assorted cards without necessitating hand labor in the sorting.

Another object of this invention is to provide a machine of the class described which is adapted to operate at a high speed so as to accomplish a large amount of sorting work in a short space of time.

A further object of the invention is to provide a machine in which a series of boxes is arranged to receive the assorted card groups and in which the groups are delivered into convenient position after the sorting operation is complete; also to improve mechanism of the class described in other respects hereinafter specified and claimed.

Reference is to be had to the accompanying drawings forming a part of this specification, in which:

Fig. 1 is a side elevation of the feed end of the sorting machine,

Fig. 2 is a plan view of the feed end of the sorting machine together with several of the boxes, Fig. 3 is a fragmentary side elevation of the sorting mechanism taken at the feed end of the machine together with several of the receiving boxes, Fig. 4 is a side elevation of the driving end of the machine, Fig. 5 is a sectional elevation of the feed end of the machine, Fig. 6 is a diagrammatic elevation of the driving arrangement for the machine, Figs. 7, 8 and 9 are sectional elevations outside of some of the boxes with the operating levers arranged in their first, second and third positions, respectively, Figs. 10, 11 and 12 are sectional elevations through the center of the boxes showing the card throwing or sorting mechanism in positions 1, 2 and 3, of operating levers shown in Figs. 7, 8 and 9, respectively, Fig. 13 is a fragmentary view on line 13—13 of Fig. 12, Fig. 14 is a perspective view of the operating levers and card sorting mechanism removed from some boxes intermediate the ends of the machine, Fig. 15 is a perspective view of the operating levers and card throwing mechanism removed from the box adjacent the feed end of the machine.

Fig. 16 is a perspective view of a portion of the mechanism,

Fig. 17 is a transverse sectional view through one of the card sorting members,

Figure 2:
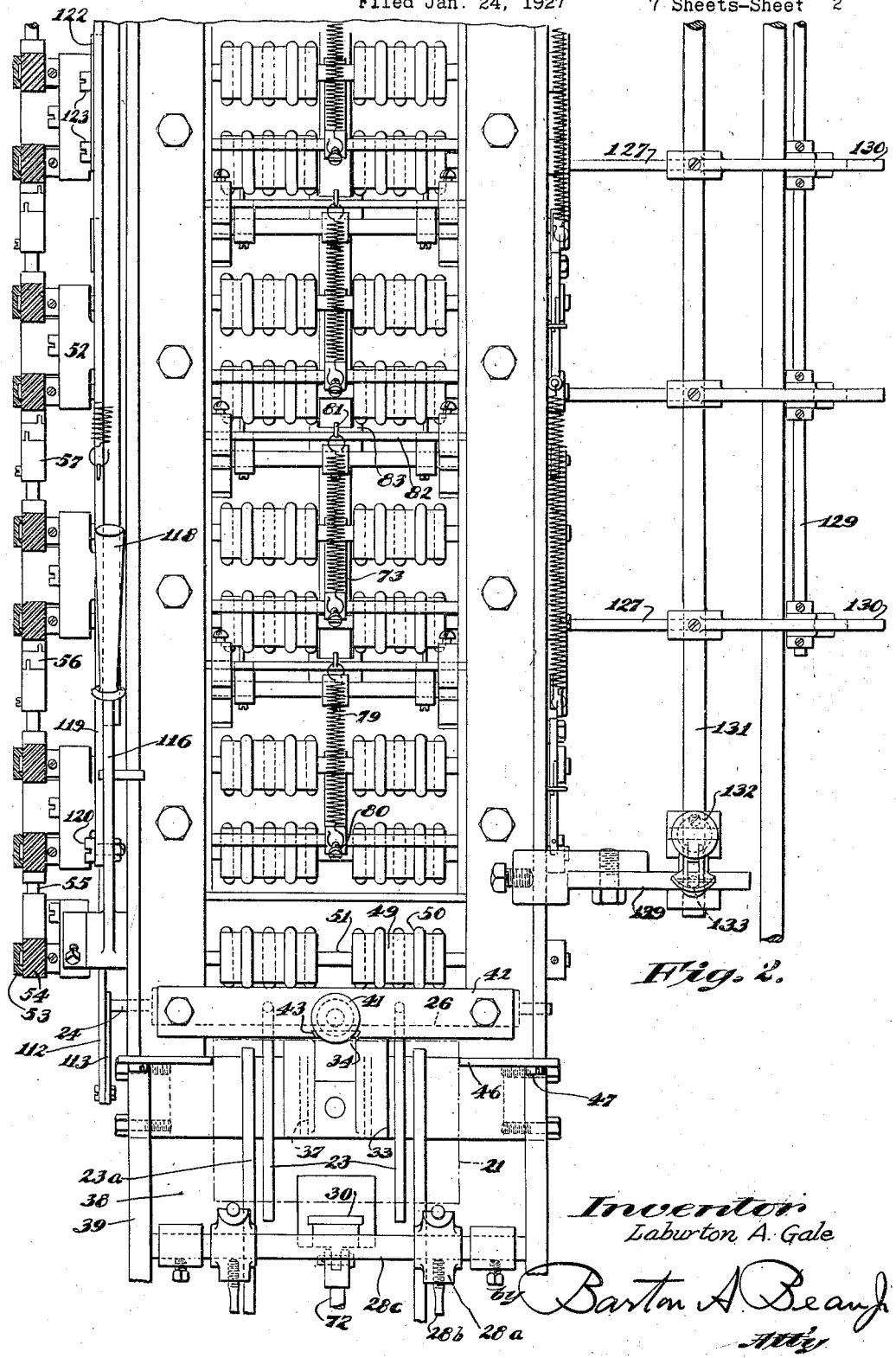

Referring to the drawings by numerals, 20 indicates a series of boxes containing mechanism for delivering one card of a stack of cards 21 into a series of receiving pockets 22, there being one pocket for each of the boxes 20.

Figure 18:
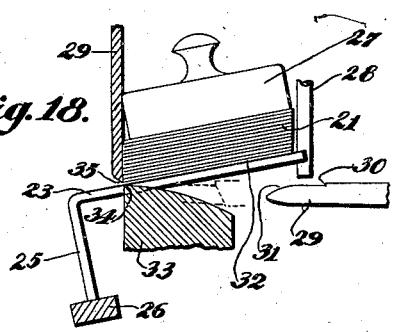
Fig. 18 is a transverse sectional view through the feed mechanism showing the stack of cards to be sorted lifted clear of the feed mechanism.

The stack of cards 21 is normally supported in card feeding position above a pair of movable arms 23, said arms being adapted to rock or oscillate about a pivot bar 24 (Figs. 15 and 18). A pair of horizontal arms 23ᵃ are also fixed in a substantially horizontal plane so as to support the stack of cards 21. In card feeding position, the bars 23 are arranged substantially horizontally and downwardly extending sections 25 of said bars 23 are secured at their lower ends onto a cross bar 26 to which the pivot bars 24 are attached. The stack of cards 21 is pressed downwardly onto the arms 23 by a weighted member 27. The stack of cards 21 is retained against transverse movement by vertical rods 28 and wall 29 of a feed box, the upper ends of guide rods 28 being mounted in brackets 28ᵃ secured by thumb screws 28ᵇ onto a transverse slide bar 28ᶜ so that the distance between said rods 28 may be adjusted to accommodate cards of different lengths. The lower ends of the rods 28 are spaced apart a short distance from a feed member 29 adapted to reciprocate in a horizontal plane by a mechanism to be hereinafter described. An upstanding shoulder 30 is formed on the upper surface of the feed member 29, said shoulder having a height only slightly thicker than the thickness of one of the cards to be sorted. The front end of the feed member 29 is provided with a beveled surface so that as the feed member 29 moves forwardly, said beveled surface 31 lifts the stack of cards slightly. The further forward movement of the feed member 29 causes the shoulder 30 to engage the rear edge of the lowermost card 32 and push said card forwardly. The forward end of the stack of cards 21 is also supported on a support member 33 having a beveled upper surface terminating in a shoulder 34. The front wall 29 on the feed box is adjustable vertically so that its lower edge 35 is spaced apart from the shoulder 34 approximately the thickness of a card to be sorted, thus permitting only one card at a time to be pushed forwardly through the opening formed between shoulders 34 and 35. As seen in Fig. 5, the shoulders 34 and 35 are semicircular in shape and the plane of the card is tangential to both shoulders.

The support member 33 is preferably adjustable longitudinally of the machine with reference to shoulder 35. This adjustment is provided by forming dovetailed groove 36 on the under surface of said support member, said groove being adapted to engage a dovetailed tongue 37 formed on a transverse frame member 38, the latter being secured to vertical standards or frames 39 of the machine. The support member 33 is then secured in any desired position by set bolts 40 passing through member 33 and engaging the tongue 37.

The front wall 29 is adjustable vertically relative to the shoulder 34 by means of a set screw 41 threaded into a transverse frame member 42 secured to the frame members 39. The wall 29 is slidably mounted on a vertical slide member 43 in any suitable way such as by a dovetailed tongue and groove. A shoulder 44 is formed on the screw 41 said shoulder engaging a slot 45 formed on the front wall 29 so that when the screw 41 is screwed into or out of the frame member 42, the shoulder 44 engages the edges of slot 45 and causes the wall 29 to be reciprocated vertically relative to the shoulder 34. Guide arms 46 are positioned one on each side of the card stack 21 by means of set bolts 47 operating in slots 48, so that individual cards are prevented from transverse shifting out of the stack 21.

As each individual card is pushed through the opening formed by shoulders 34 and 35, it is received between a pair of drive rolls 49 having annular beads 50 on their surfaces so that the beads 50 on the upper roll are arranged between the beads 50 on the lower roll. The rolls 49 are spaced apart so that the beads on the upper and lower rolls slightly overlap, thus causing said beads to positively grip the card and move it ahead through a series of rolls and boxes. In practice as many as 50 of these boxes may be arranged in a single series, and each box preferably contains two pairs of drive rolls so that the card is well supported and is driven ahead positively at all times in its travel. The rolls 49 are rotatably mounted on shafts 51 which extend transversely of the boxes 20, being rotatably mounted in bearing brackets 52 secured to the outside walls of said boxes 20. One end of each of the shafts 51 is provided with a spiral gear 53 meshing with a spiral gear 54 secured to a longitudinal shaft 55. Each spiral gear 54 is arranged between the upper and lower spiral gears 53 of the pair of shafts 51 so as to drive both gears 53 simultaneously. The shaft 55 is preferably in sections connected by clutches 56 so that the individual sections of the shaft 55 may be slightly out of line without causing series trouble, due to the clutch members 56. The drive shaft sections 55 are rotatably mounted in bearings 57 secured to the outer walls of boxes 20. It should be understood that any other suitable way of driving the rolls 49 may be used if desired.

The motive power for the machine is preferably an electric motor 58 mounted on a rear frame 59 of the machine. This motor is connected by a belt 60 to the drive shaft 55 and a second belt 61 connects a pulley 62 on shaft 55 to a pulley 63 on a shaft 64. This shaft 64 extends longitudinally of the machine to the feed end thereof where a spiral gear 65 secured thereto meshes with a second spiral gear 66 secured to a transverse shaft 67. The shaft 67 is mounted in a bearing 68 secured to a machine frame 39 and the inner end of said shaft 67 has secured thereto a crank arm 69 to which is pivotally connected one end of a crank 70. The other end of crank 70 is pivotally connected to cross head 71, which in turn is connected to a bar 72 slidingly mounted in the frame 39 and secured at its forward end to feed member 29 so as to accomplish the reciprocation thereof.

In each of the boxes 20 is arranged a trigger 73 having a bracket at its upper end secured to a transverse rock shaft 75. This rock shaft 75 is rotatably mounted at its ends in the walls of the box 20 and one end of said shaft 75 has secured thereto, outside the box 20, a lever 76. The rocking or oscillating movement of the shaft 75 is limited by stop pins 77 and 78 secured to the box wall and adapted to engage the lever 76. A spring 79 connects a stud 80 on the bracket 74 to a hook 81 on the upper edge of a dividing wall 82 between the boxes 20 so that the shaft 75 is normally urged in a counter-clockwise direction, as seen in Fig. 10, with the lever 76 in contact with stop pin 78. As the cards move from box to box being driven by the rolls 49, they lift the trigger members 73 until a given card reaches the last box of the series where the actuation of the last trigger 73 causes a deflector 83 in the last box to be moved downwardly into an inclined position, as shown in Fig. 12, so that the moving card is deflected downwardly and drops into its corresponding receiving pocket 22. The deflector 83 is provided at its upper end with a yoke 84 which is adapted to be detachably secured to a transverse rock shaft 85 by means of a set screw 86 passing through one leg of said yoke and engaging the shaft 85. The shaft 85 also extends through the walls of the box 20 and one end of said shaft 85 extends beyond the box wall and has rotatably mounted thereon a lever 87. The upper end of lever 87 is connected by a spring 88 to a fixed hook 89 so that said lever 87 is urged to rotate in a counter-clockwise direction.

A lever 90 is attached to the shaft 85 in the next box and a link 91 pivotally connects the end of lever 90 with a pivot pin 92 near the outer end of the lever 87. As seen in Fig. 14, the links 91 connecting the levers of the series of boxes, are in staggered relation, that is the links in alternate boxes will be on opposite sides of the boxes. It should be noted in Figs. 11 and 12, that the deflector 83 has three different positions during the operation of the machine. The normal position is horizontal, as shown by dotted lines in Fig. 11, in which position the card 32 is free to pass from box to box down the series of boxes being driven by the rolls 49. In the position shown by full lines in Fig. 11 the deflector is inclined slightly downwardly, which is a position intermediate the final position shown in Fig. 12 where the deflector is inclined downwardly about 45 degrees in full deflecting position so that card 32 is deflected downwardly in a particular box and is deposited in one of the receiving pockets 22. As seen in Fig. 13, the deflector 83 has a cut-away slot 93 which is adapted to receive the end of a stationary deflector member 94ª. When in the position shown in Fig. 12, the stationary deflector 94ª and movable deflector 83 lie substantially in the same inclined plane so that the forward edge of the moving card slides downwardly along the uni-planar deflecting surfaces formed by deflectors 83 and 94ª. Mechanism will now be described which is adapted to move deflector 83 into its three positions, said mechanism being adapted to be actuated by the trigger 73.

Each shaft 85 has secured to it adjacent the lever 87, a lever 94. When the mechanism is first set for starting the operation of the sorting machine, the lever 94 is in the position shown in Fig. 7, where its end is spaced apart from the stop dog 95 formed on a lever 96. The lever 96 is rotatably mounted on a pivot pin 97 secured in any suitable way to the outer wall of the box. The outer end of the lever 96 has a yoke 98 formed thereon adapted to slidably receive a pin 99 extending transversely of the end of lever 76 so that a toggle action exists between levers 76 and 96 and so that the upward movement of the lever 76 under the action of the trigger 73 causes the lever 96 to move upwardly until the stop dog 95 is lying out of the path of travel of the end of lever 94. The lever 87 is rotatably mounted on the shaft 85 between the lever 94 and a washer 100 secured to the end of said shaft by screw 101.

In order to hold the lever 94 in its lowermost position, as shown in Fig. 7, against the action of spring 88 in the adjoining box, an outstanding pin 102 is formed near the end of lever 94, said pin being adapted to engage under a tooth or shoulder 103 formed on a catch lever 104. The lever 104 is secured to a stud 105 which in turn is rotatably mounted in the outer wall of box 20 in any suitable way. The lower end 106 of the lever 104 is of massive, offset construction so that gravity normally tends to hold the shoulder 103 in contact with the pin 102. This action is further aided by a delicate spring 107 connecting the lower end of lever arm 106 to a hook 108 secured to the bottom of the adjoining box 20. The upper end of lever 104 has a curved section 109 terminating in upwardly extending straight section 110. The section 109 extends between the washer 100 and lever 94 and a pin 111 is secured to the lever 87 so as to lie in the path of travel of the lever section 110. Sufficient clearance is provided between the curved lever section 109 and the shaft 85 so that the lever 104 may move slightly in a counter-clockwise direction until the shoulder 103 is disengaged from the pin 102. This releasing of the shoulder 103 enables the lever 94 and shaft 85 to move in a counter-clockwise direction under the action of the spring 88 acting through link 91 on the end of lever 90 of the adjoining box. When released, the lever 94 moves upwardly until the end of the same engages the lower end of dog 95 whereupon the deflector 83 will be in its intermediate position, as shown in full lines in Fig. 11 in the right hand box.

The next card traveling through the series of boxes will now raise the trigger 73 against the action of delicate spring 79, thus causing the lever 76 to move in a clockwise direction until it engages stop pin 77. The pin 99 will act on the lever yoke 98 and move the lever 96 in a counter-clockwise direction until dog 95 is released from the end of lever 94. Lever 94 and shaft 85 will now again move in a counter-clockwise direction under the action of spring 88 acting through link 91 and lever 90, until the deflector 83 is in its lowermost position as shown in Fig. 12. Thus the card 32 which has just actuated the trigger 73 will be deflected downwardly into its respective pocket 22 by the combined action of the deflectors 83 and 94ª. The mechanism in the last box of the series adjacent the motor 58 will be so adjusted that the deflector 83 assumes only two positions, namely, the intermediate position shown in full lines in the right box of Fig. 11 and the lowermost position shown in Fig. 12. Thus the stack of cards 21 will successively pass through the boxes and successively deposit a card in each box beginning with the box adjacent the motor 58 and finishing in the box adjacent the stack 21.

Figure 3:
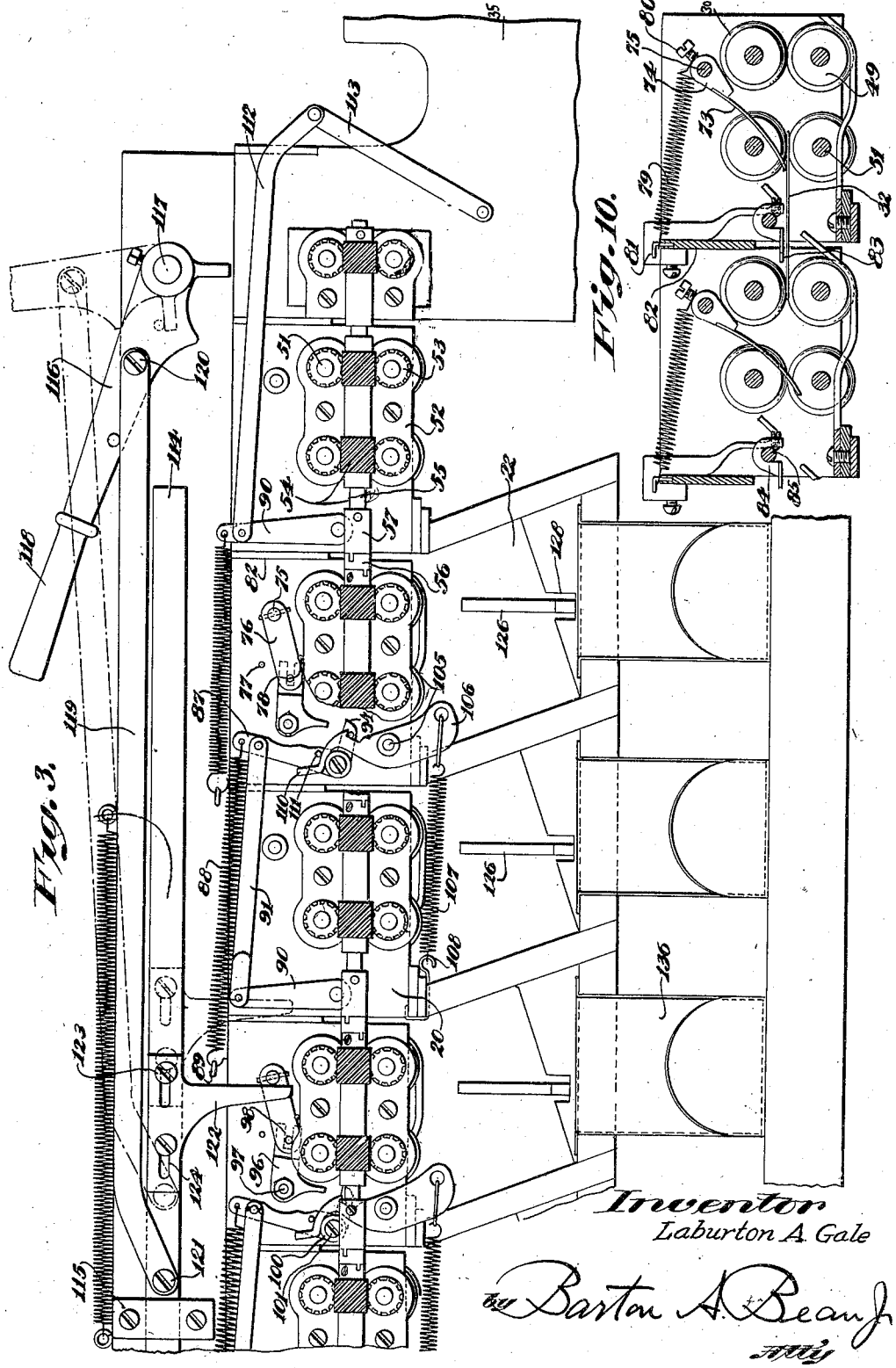
Figure 4:
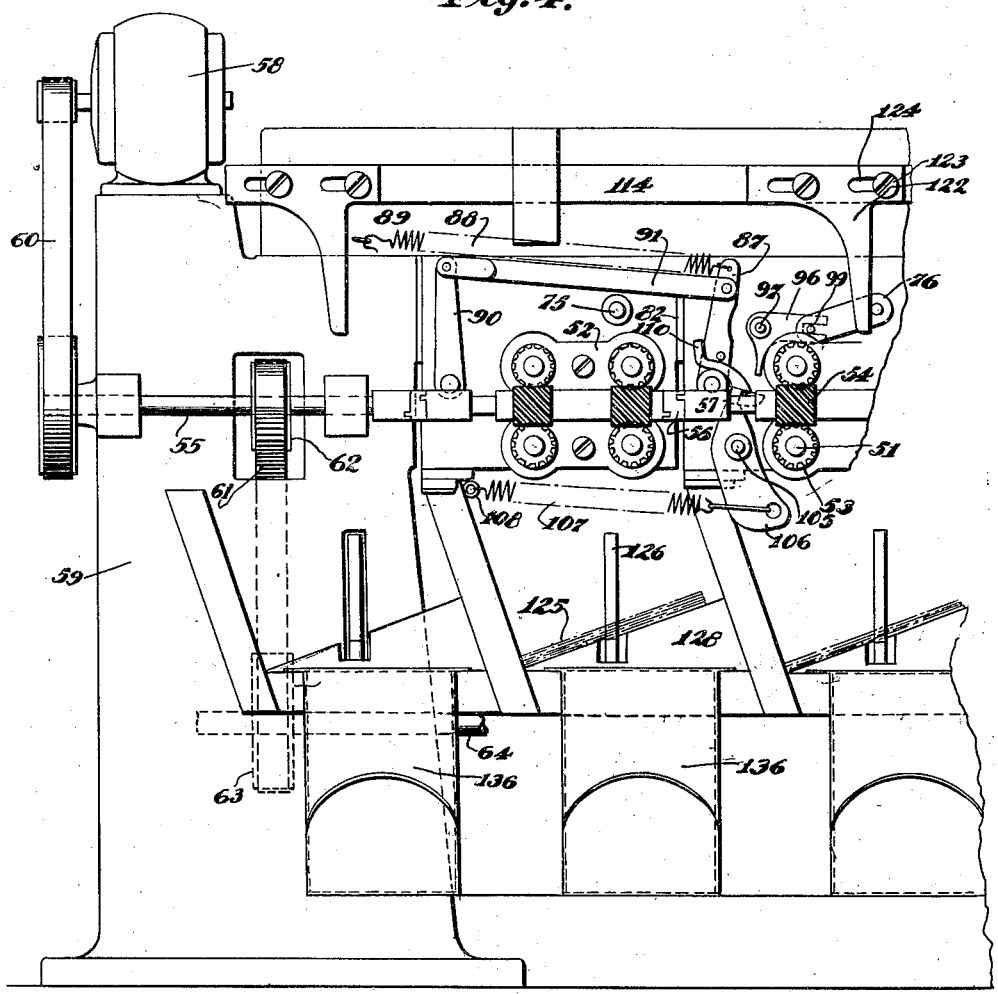

The last lever 90 adjacent the stack 21 is connected by a link 112 to one end of a lever 113. The opposite end of the lever 113 is secured to the end of pivot bar 24 so that when the last card is deposited in the boxes, the counter-clockwise movement of lever 90 causes a counter-clockwise movement of lever 113, pivot bar 24 and arms 23 so that the rear end of the card stack 21 is lifted upwardly out of the path of travel of the feed shoulder 30, thus preventing the feeding of any more cards into the machine even though the feed member 29 continues to reciprocate. After one card has been deposited in each box from the stack of cards 21, the stack of cards 21 is usually replaced by another stack of a different variety of cards. In order to reset the mechanism in each box, a reciprocating bar 114 extends the length of the machine and is slidably mounted for reciprocating movement in slide bearing 115 secured to the frame of the machine. A lever 116 is mounted on pivot 117 for oscillating movement, said lever being provided at its outer end with a handle 118. Intermediate the pivot 117 and the handle 118 is a connecting link 119 pivotally connected at one end to a pivot 120 on a lever 116 and pivotally connected at the opposite end on a pivot 121 on slide bar 114. A series of downwardly extending arms 122 are adjustably secured to the slide bar 114 by means of screws 123 received in slots 124 on said arms 122. Each of the arms 122 extends downwardly so as to engage each of the levers 90 as the bar 114 is moved to the right, as seen in Fig. 3, by means of lever 116. Thus the arms 122 move the levers 90 in a clockwise direction so that pins 102 are again caught under shoulder 103 which again sets the mechanism ready for the sorting of the new stack of cards 21.

These sorting operations are continued until each group 125 of cards in pockets 22 contains one each of the cards of each variety, all of said groups 125 preferably having the same number and assortment of cards. This use of the machine in sorting the cards is the customary one, but it should be understood that the machine may be used in any other way for the sorting of cards and documents. After the groups of cards 125 are complete, they are pushed to the left, as seen in Fig. 5, by means of pushing arm 126 formed on slide 127. The slide 127 operates below each group of cards in a slot 128. The outer end of the slide 127 is pivotally connected by pin 129 to the lower end of lever 130, the upper end of said lever being secured to a rock shaft 131. An operating lever 132 is also secured to the rock shaft 131, said lever 132 having a spring-actuated detent 133 of usual construction operating in a slot 134 on a semi-circular member 135, so as to secure the pusher arm 126 in card receiving position. When the pusher arm 126 is moved to the left, as seen in Fig. 5, by means of lever 132, it pushes the groups of cards 125 into receiving trays 136 where the operator may take the groups of cards from the machine and pack them for shipment.

In operation the stack of cards 21 is placed in the feed box behind vertically adjustable front wall 29 and the cards are pushed out from the bottom of the stack one by one by means of the feed shoulder 30 and reciprocating feed member 29. Each of the cards 32 is driven through the series of boxes 20 by means of drive rolls 49, the trigger 73 in each box being lifted by the card as said card passes through the box. When the trigger in the next to the last box of the series is actuated, the last deflector 83 in the last box moves downwardly into deflecting position as shown in Fig. 12, so that it cooperates with the fixed deflector 94ª in causing the card to be deflected downwardly into its corresponding pocket 22. The downward movement of the deflector 83 of the last box occurs while the last shaft 85 partially rotates, carrying with it lever 90, link 91 and lever 87 (Fig. 9) so that pin 111 acts on lever section 110 to slightly rotate the lever 104 about its pivot 105 to disengage shoulder 103 from the catch pin 102. Lever 94 in the next to the last box now moves upwardly under the action of spring 88 until the end of said lever 94 engages the stop dog 95 in which case the deflector 83 is in intermediate position, as shown in full lines in the right hand box of Fig. 11. As the second card passes through the series of boxes and finally operates the trigger 73 in the next to the last position, shaft 75 and lever 76 are slightly rotated in a clockwise direction, the latter rotating the lever 96 in a counter-clockwise direction so that dog 95 is disengaged from the end of lever 94. Shaft 85 in the next to the last position then continues its counter-clockwise rotation, under the action of spring 88 acting through link 91 and lever 90, until the deflector 83 is moved to the lowermost position where it cooperates with fixed deflector 94$^a$ in causing the second card to be deposited in the next to the last pocket 22. This operation is continued until each pocket 22 has one card each of the stack of cards 21.

After the last card is deposited in its pocket 22, lever 90 in the first box is actuated by spring 88 causing lever 113 and pivot bar 24 to be partially rotated in a counter-clockwise direction by link 112. This action causes the arms 23 to lift the rear end of the stack of cards 21 free of the feed shoulder 30 so that no more cards will feed into the machine as the feed member 29 reciprocates. A new stack of cards is now placed in the feed box and lever 116 is moved to the right as seen in Fig. 3 which causes slide bar 114 and arms 122 to move to the right so that said arms pull back the levers 90 into set position where catch pins 102 are engaged by shoulders 103. This movement of lever 116 lowers the rear end on the cards 21 into the path of travel of the said shoulder 30 so that cards again start through the machine and are successively deposited in the pockets 22 of the series. These sorting operations are continued until the desired number of cards are deposited in each group 125 of cards in the pockets 22. Lever 132 is then actuated about its pivot 131 in a clockwise direction which causes the pusher arm 126 to push the groups of cards 125 to the left, as seen in Fig. 5, so that each group of cards is deposited in its respective tray 136 to be taken by the operator and packed for shipment or otherwise disposed of.

I would state in conclusion that while the examples illustrated and described represent a preferred embodiment of my invention, I do not limit myself precisely to these details as to use and construction, since manifestly the same can be considerably varied without departing from the spirit of the invention as defined in the appended claims.

I claim as my invention:

1. In a throwing machine, a series of containers, means for successively feeding the cards of a stack along said series of containers, and means operated during the movement of and by each card to cause a card to be deposited in each of said series of containers.

2. In a throwing machine, a series of containers, means for successively feeding the cards of a stack along said series of containers, and a trigger adjacent each of said containers adapted to be actuated by the moving cards so as to successively deposit a card in each of the series of boxes.

3. In a card throwing machine, a series of containers, means for successively feeding the cards of a stack along said series of containers, a deflector and a trigger adjacent each container, each card being adapted to actuate the triggers of the containers during the movements thereof, and connecting means between said triggers and deflectors adapted to successively actuate said deflectors and cause a card to be deposited in each container.

4. In a throwing machine, a series of containers, means for successively feeding the cards of a stack along said series of containers, a trigger adjacent each of said containers adapted to be actuated by the moving cards so as to successively deposit a card in each of the series of boxes, and means for resetting said triggers for the next card throwing operation.

5. In a card throwing machine, a series of boxes, a card pocket associated with each of said boxes, means associated with said boxes for successively feeding the cards of a stack along said series of boxes, means for causing a card to be deposited in each of said pockets, a tray associated with each pocket, and means for causing a group of cards in a pocket to be moved into a tray.

6. In a card throwing machine, a series of containers, driving rolls associated with each container adapted to successively move the cards of a stack along said series of boxes, and means operated by the moving card adapted to cause a card to be deposited in each of said series of containers.

7. In a card throwing machine, a series of containers, means for successively feeding each of a stack of cards along said series of containers, and card actuated means associated with said containers adapted to cause the first card to be deposited in the container farthest from the stack, the next card in the adjoining container and so forth until each container contains a card.

8. In a card throwing machine, a series of triggers, a series of deflectors operatively connected to said triggers, means for successively moving a plurality of cards past said triggers so that said triggers are successively actuated by said cards, and means for causing said deflectors to be actuated by said triggers so as to successively deflect the cards downwardly.

9. In a card throwing machine, a series of deflectors, means for successively moving a plurality of cards past said deflector, and means actuated by the moving cards for successively causing said deflectors to move into an upper, intermediate and lower position, said deflectors being adapted to successively deflect the cards downwardly when in said lower position.

10. In a card throwing machine, a feed member adapted to reciprocate so as to successively feed cards from the bottom of a stack of cards, a series of containers, means for moving the cards successively along said containers, deflecting means for successively depositing cards in said containers, and means adjacent the stack of cards and operatively connected with said deflecting means for moving said stack of cards into inoperative position relatively to said feed member when a card is deposited in the container adjacent the stack of cards.

11. In a card throwing machine, a series of containers, a deflector shaft and a trigger shaft associated with each container, means for successively feeding a plurality of cards along said series of containers, levers associated with said deflector shafts and trigger shafts, and means operatively connecting said trigger shafts and deflector shafts so that when said trigger shaft is actuated by a moving card, the deflector shaft will be actuated so as to deflect the moving card downwardly.

12. In a card throwing machine, a series of containers, a deflector member associated with each of said containers, means for successively moving the cards of a stack along said containers, a stationary deflector member, and means actuated by the moving card for causing said movable deflector to cooperate with the stationary deflector so as to cause the moving card to be deflected downwardly.

13. In a card throwing machine a series of containers, a deflector, a deflector shaft and a trigger shaft rotatably associated with each of said containers, means associated with said trigger shaft adapted to stop the rotation of said deflector shaft in an intermediate position, means for causing the trigger shaft to release said catch means so as to permit the rotation of said deflector shaft into deflecting position, means for causing a succession of cards to pass along said series of containers, and means associated with said deflector shafts adapted to successively deflect a moving card downwardly when said deflector shaft is in deflecting position.

14. In a card throwing machine, a series of containers, a deflector shaft associated with each of said containers, spring means for urging said deflector shaft to rotate, a catch shoulder adapted to prevent the rotation of said deflector shaft, a lever rotatably mounted on said deflector shaft, trigger means associated with each container, means for passing a succession of cards along said containers, each card being adapted to actuate said trigger means so as to move said lever and release said catch shoulder, thus permitting the rotation of said deflector shaft into deflecting position to deflect a moving card downwardly.

15. In a card throwing machine, a series of containers, a pair of drive rolls associated with each container, annular shoulders formed around the periphery of said drive rolls, the annular shoulders of the pair of rolls being in staggered relation and overlapping, means for feeding a succession of cards through said drive rolls, said cards being engaged and positively driven by the annular shoulder on said drive rolls and deflecting means associated with each container adapted to successively deflect the cards downwardly.

16. In a card throwing machine, a series of containers, a deflector shaft associated with each container, a catch lever fixed to said deflector shaft, a second lever rotatably mounted on each deflector shaft, a stop shoulder operatively connected with said catch lever and second lever, a trigger member associated with each container, means for feeding a succession of cards along said containers, said trigger member being adapted to be actuated by a moving card so that said fixed lever, second lever and stop shoulder permit the partial rotation of said deflecting shaft to deflecting position in order to deflect a moving card downwardly.

17. In a throwing machine, a series of containers, means for feeding cards successively from a stack along said series of containers, card deflecting means associated with each container, and card actuated means associated with each container adapted for successively operating said deflecting means to deposit a card in each container.

18. In a throwing machine, a series of containers, means for feeding cards successively from a stack along said series of containers, card deflecting means associated with each container, card actuated means associated with each container for operating said deflecting means, and means connecting the card deflecting means for associated operation by said card actuated means to successively deposit a card in each container.

19. In a throwing machine, a series of containers, means for feeding cards successively from a stack along said series of containers, card deflecting means associated with each container, card actuated means, and means having associated operation with the card actuated means and the card deflecting means to produce a successive operation of said card deflecting by said card actuated means to deposit a card in each container.

20. In a throwing machine, a series of containers, means for feeding cards successively from a stack along said series of containers, card deflecting means associated with each container, card actuated means, means having associated operation with the card actuated means and the card deflecting means to produce a successive operation of said card deflecting by said card actuated means to deposit a card in each container, and resetting means for the card deflecting means.

LABURTON A. GALE.